(12) United States Patent
Modisette

(10) Patent No.: US 6,936,663 B1
(45) Date of Patent: Aug. 30, 2005

(54) POWDER COATING COMPOSITIONS CONTAINING POSS COMPOUNDS

(75) Inventor: Robert Modisette, Oxnard, CA (US)

(73) Assignee: Conano Corporation, Carpinteria, CA (US)

( * ) Notice: Subject to any disclaimer, the term of this patent is extended or adjusted under 35 U.S.C. 154(b) by 0 days.

(21) Appl. No.: 10/886,227

(22) Filed: Jul. 6, 2004

Related U.S. Application Data

(60) Provisional application No. 60/485,023, filed on Jul. 7, 2003, provisional application No. 60/485,041, filed on Jul. 7, 2003, provisional application No. 60/488,662, filed on Jul. 21, 2003.

(51) Int. Cl.$^7$ ............................................. C08K 83/04
(52) U.S. Cl. ...................... 525/476; 525/934; 525/431; 525/104; 525/106; 525/446; 525/453; 525/100
(58) Field of Search ................................ 525/934, 476, 525/100, 104, 106, 431, 446, 453

(56) References Cited

U.S. PATENT DOCUMENTS

| | | | |
|---|---|---|---|
| 5,047,492 A | | 9/1991 | Weidner et al. |
| 5,145,943 A | * | 9/1992 | Li et al. ...................... 528/353 |
| 5,147,966 A | * | 9/1992 | St. Clair et al. ............ 528/188 |
| 5,235,005 A | * | 8/1993 | Shiobara et al. ............ 525/479 |
| 5,412,053 A | | 5/1995 | Lichtenhan et al. |
| 5,484,867 A | | 1/1996 | Lichtenhan et al. |
| 5,516,858 A | * | 5/1996 | Morita et al. ................ 525/478 |
| 5,589,562 A | | 12/1996 | Lichtenhan et al. |
| 5,858,544 A | | 1/1999 | Banaszak Holl et al. |
| 5,939,576 A | | 8/1999 | Lichtenhan et al. |
| 5,942,638 A | | 8/1999 | Lichtenhan et al. |
| 6,100,417 A | | 8/2000 | Lichtenhan et al. |
| 6,362,279 B2 | | 3/2002 | Lichtenhan et al. |
| 6,437,087 B1 | | 8/2002 | Kulzick et al. |
| 6,509,413 B1 | | 1/2003 | Muthiah et al. |
| 6,660,823 B1 | | 12/2003 | Lichtenhan et al. |
| 6,710,137 B2 | | 3/2004 | Matsumoto et al. |
| 6,767,930 B1 | * | 7/2004 | Svejda et al. ................ 521/134 |

OTHER PUBLICATIONS

"Powder Coating: Why-How-When", Journal of Paint Technology vol. 44, No. 565, Feb. 1972, pp. 30-37.*

Prof. Feng-Chih Chang, "POSS Nanocomposites" Internet Publication of NCTU (best available copy).

Hongyao Xu, et al, "Poly (acetoxystyrene-co-isobutylstyryl POSS) Nanocomposites," Journal of Polymer Research 9: 239-244, 2002.

Reade Advanced Materials, "POSS Molecules," Internet Publication of Reade.com.

Air Force/AFRL-Propulsion Directorate, "Technology Commercialization Opportunity Polyhedral Oligomeric Silsesquioxanes".

R.A. Mantz, et al, "Thermolysis of Polyhedral Oligomeric Silsesquioxane (POSS) Macromers . . . ", Chem. Mater. 1996, 8, 1250-1259.

Hybrid Plastics, "POSS Chemical Catalog," Publication by Hybrid Plastics, Sep. 2002 revision.

\* cited by examiner

*Primary Examiner*—Margaret G. Moore
(74) *Attorney, Agent, or Firm*—Jeffrey F. Craft; Paul D. Chancellor

(57) ABSTRACT

Disclosed is a powder coating composition containing a powder coating resin and a polyhedral oligomeric silsesquioxane ("POSS") compound.

13 Claims, No Drawings

US 6,936,663 B1

POWDER COATING COMPOSITIONS CONTAINING POSS COMPOUNDS

This application claims priority based on provisional application Nos. 60/485,023, filed Jul. 7, 2003, 60/485,041, filed Jul. 7, 2003, and 60/488,662, filed Jul. 21, 2003.

BACKGROUND OF THE INVENTION

1. Field of the Invention

This invention relates to the chemical arts. In particular, this invention relates to powder coating compositions having improved properties.

2. Discussion of the Related Art

The demand for powder coating coatings for the protection and decoration of household fixtures and appliances, furniture made of steel, building materials, and parts for automobiles has rapidly increased, because powder coating are less polluting and free from organic solvents. However, there remains a need for powder coatings having improved physical properties, such as improved such as improved adhesion, weatherability, corrosion resistance, scratch resistance, and glass transition temperature properties.

SUMMARY OF THE INVENTION

Now in accordance with the invention there has been found powder coating compositions having improved properties, such as improved adhesion, weatherability, corrosion resistance, scratch resistance, and glass transition temperature. The powder coating compositions include a powder coating resin and a polyhedral oligomeric silsesquioxane ("POSS") compound. The amount of POSS compound in the powder coating composition is preferably from about 0.1 to about 10 wt. %, more preferably in an amount from about 1 to about 5 wt. %, based on the total weight of the coating composition.

Suitable powder coating resins include thermosetting resins, such as epoxy resins, polyester resins, acrylic resins, urethane resins, and thermoplastic resins, such as nylon resins, polyvinylchloride resins, polyvinylidene fluoride resins, polyethylene resins, polyethylene terephthalate resins, polybutylene terephthalate resins, polytetrafluoroethylene resins, polypropylene resins and mixtures thereof.

Suitable POSS compounds are represented by the formula:

where z is the number 4, 6, 8, 10 or 12 and each R is independently a hydrogen radical, a siloxy radical, or a cyclic or linear aliphatic, aromatic, olefinic, or an alkoxy hydrocarbon radical containing from 1 to 20 carbon atoms. In some preferred embodiments, z is eight, and in some preferred embodiments, R is a methyl, an ethyl, a propyl, a butyl, a hexyl, a heptyl, an octyl, a cyclohexyl, a phenyl, a vinyl, an allyl, a hexenyl, a heptenyl, or an octenyl radical or a methyl, an ethyl, a propyl, a butyl, a hexyl, a heptyl, an octyl, a cyclohexyl radical linked to one of the Si atoms by oxygen.

In some embodiments, the powder coating compositions contain other ingredients, such as an effective amount of a curing agent.

In a preferred embodiment, the powder coating composition is prepared by melt blending a mixture of the powder coating resin with the POSS compound to form a blended product and then grinding the blended product to form a powder.

DETAILED DESCRIPTION OF THE PREFERRED EMBODIMENTS

Now in accordance with the invention, it has been found that the properties of powder coating compositions, such as their adhesion, weatherability, corrosion resistance, scratch resistance, and their glass transition temperature, can be improved by adding a polyhedral oligomeric silsesquioxane ("POSS") compound to the coating compositions.

The powder coating compositions of this invention contain one or more thermosetting or thermoplastic resins commonly used in such coatings and well known in the art. Representative thermosetting resins include those based on epoxy, polyester, acrylic and/or urethane resins. Examples of such thermosetting resins include saturated and unsaturated polyesters, acrylics, acrylates, polyester-urethanes, acrylic-urethanes, epoxy, epoxy-polyester, polyester-acrylics and epoxy-acrylics. Useful thermoplastic resins may include nylon, polyvinylchloride, polyvinylidene fluoride, polyethylene, polyethylene terephthalate, polybutylene terephthalate, polytetrafluoroethylene, and polypropylene, for example.

The term "POSS" as used herein is generally intended to mean multi-ring structures consisting of silicon atoms single bonded to an oxygen atom and arranged in a molecular configuration such that each silicon atom is linked with three oxygen atoms. The POSS compounds correspond to the general formula:

where z is the number 6, 8, 10 or 12, preferably 8. Examples of POSS compounds are shown below.

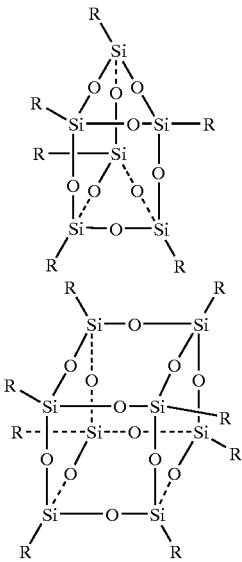

-continued

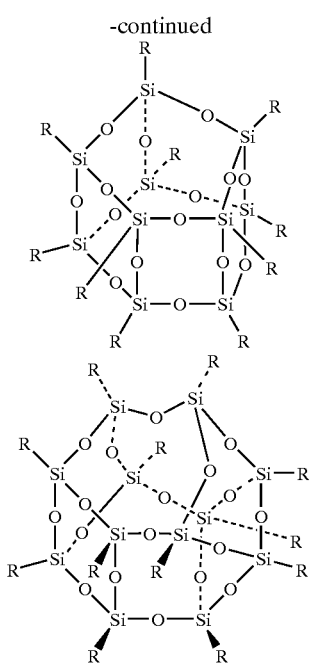

R can be either unreactive or reactive. Suitable unreactive radicals include hydrogen radicals, siloxy radicals, or a cyclic or linear aliphatic, aromatic, olefinic, or alkoxy hydrocarbon radicals, containing from 1 to 20 carbon atoms. Examples of aliphatic radicals include methyl, ethyl, propyl, butyl, hexyl, heptyl, octyl, and cyclohexyl radicals. Examples of aromatic radicals include phenyl radicals. Examples of olefinic radicals include vinyl, allyl, hexenyl, heptenyl, and octenyl radicals. Examples of alkoxy radicals include the alkyl radicals listed above linked by oxygen.

R can be made reactive by including one or more reactive functionalities. Suitable reactive functionalities include alcohol, phenol, epoxide, ester, including (meth)acrylate ester, amine, ketone, olefin, ether, halide, alkoxysilane, chlorosilane, isocyanate, nitrile, or thiol functionalities. The POSS compounds can be either homoleptic or heteroleptic. Homoleptic compounds contain only one type of R group while heteroleptic compounds contain more than one type of R group. Representative POSS compounds include compounds where z is 8 and each R is an i-butyl radical, an epoxycyclohexyl radical or a methacrylate radical.

Suitable POSS compounds are commercially available, for example, from Hybrid Plastics, Fountain Valley, Calif.

The POSS compound is included in an amount sufficient to improve at least one physical property of the powder coating composition. Representative properties include adhesion, weatherability, corrosion resistance, scratch resistance, and glass transition temperature. Preferably from about 0.1 to about 10 wt. %, more preferably from about 1 to about 5 wt. %, POSS compound is added to the powder coating composition, based on the total weight of the coating composition.

In a preferred embodiment, thermosetting powder coating compositions are prepared by first melt blending the powder coating resin with the POSS compound. This process usually involves dry blending the ingredients in a planetary mixer and then melt blending the admixture in an extruder, such as an extended time, twin-screw extruder, at a suitable temperature. The extrusion temperature is preferably chosen so that it is high enough to allow the resin to melt to a viscosity that produces good mixing, but is not so high that any significant amount of curing occurs. The melt blending is usually carried out within the range of from 80° C. to 130° C.

The extrudate is then cooled, for example between water cooled rollers, and pulverized. The extrudate may be crushed to a fine flake or granule and then ground by typical methods employed in the art, and classified by sieving or other means. The maximum particle size and the particle size distribution are controlled in the classifying step and affect the smoothness of the final film. Requirements for these parameters depend upon the particular use and application method.

The powder coating composition can contain conventional additives. Representative additives include fillers, pigments, leveling agents to help coalesce the film, plasticizers, air release agents, such as benzoin, flow agents, such as poly(butyl acrylates) and poly(2-ethylhexyl acrylates), hindered amine light stabilizers and ultraviolet light absorbers, antioxidants, and/or catalysts. Moreover, a texturing agent, such as particulate rubber, may also be included, to more finely adjust the degree of texture. Other suitable additives include an effective amount of curing agents or cross-linkers, optical brighteners, extenders, and hardeners.

Pigments and fillers may be utilized in amounts typically of up to 40% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, ferric ammonium ferrocyanide (Prussian blue), ultramarine, lead chromate, lead molybdate, mica flake pigments, calcium carbonate and bentonite clays. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

Hindered amine light stabilizers, ultraviolet light absorbers, and antioxidants may be added in ways and amounts known to the art to augment the durability of the finished coating, and are particularly useful when the finished coating may be subjected to outdoor exposure.

The additional ingredients can be added to the powder coating composition before melt blending, after melt blending, or both before and after.

The powder coating compositions can be applied onto many different substrates, including metal substrates such as bare steel, phosphated steel, galvanized steel, brass or aluminum; and non-metallic substrates, such as plastics, composites, and fiberboard. The substrate may also be any of these materials having upon it already a layer of another coating, such as a layer of an electrodeposited primer, cured or uncured before the application of the powder coating compositions.

The powder coating compositions of this invention can be applied by any suitable method. Representative methods include electrostatic spray, thermal or flame spraying, or fluidized bed coating methods. Electrostatic spraying is the preferred method. The coating powder can be applied in one or more passes to provide a film thickness after cure of from 25 to 400 microns. The substrate can optionally be preheated prior to application of a powder coating composition to promote uniform and thicker powder deposition.

Following deposition of the powder coating to the desired thickness, the coated substrate is typically heated to melt the composition and cause it to flow. In certain applications, the part to be coated may be pre-heated before the application of the powder, and then either heated after the application of the powder or not. Gas or electrical furnaces are commonly used for various heating steps, but other methods (e.g., microwave) can also be used. Curing (i.e., cross-linking) of the coating can be a carried out by thermal or photochemical methods (e.g., ultraviolet radiation, infrared radiation, etc.). Curing may be effected by heat conduction, convection, radiation or any combination thereof

I claim:

1. A powder coating composition formed by melt blending a mixture of a powder coating resin with a POSS compound to form a blended product and then grinding the blended product to form a powder, the POSS compound represented by the formula:

$$[RSiO_3]_z$$

where z is the number 4, 6, 8, 10 or 12 and each R is independently a hydrogen radical, a siloxy radical, or a cyclic or linear aliphatic, aromatic, olefinic, or an alkoxy hydrocarbon radical containing from 1 to 20 carbon atoms.

2. The powder coating composition of claim 1 wherein at least one R is substituted with one or more alcohol, phenol, epoxide, ester, amine, ketone, olefin, ether, halide, alkoxysilane, chlorosilane, isocyanate, nitrile, or thiol functionality.

3. The powder coating composition of claim 1 wherein R is a methyl, an ethyl, a propyl, a butyl, a hexyl, a heptyl, an octyl, a cyclohexyl, a phenyl, a vinyl, an allyl, a hexenyl, a heptenyl, or an octenyl radical or a methyl, an ethyl, a propyl, a butyl, a hexyl, a heptyl, an octyl, a cyclohexyl radical linked to one of the Si by oxygen.

4. The powder coating composition of claim 3 wherein at least one R is substituted with one or more alcohol, phenol, epoxide, ester, amine, ketone, olefin, ether, halide, alkoxysilane, chlorosilane, isocyanate, nitrile, or thiol functionality.

5. The powder coating composition of claim 1 wherein the powder coating resin is an epoxy resin, a polyester resin, an acrylic resin, an urethane resin, a thermoplastic resin or mixtures thereof.

6. The powder coating composition of claim 5 wherein the powder coating resin is a nylon resin, a polyvinylchloride resin, a polyvinylidene fluoride resin, a polyethylene resin, a polyethylene terephthalate resin, a polybutylene terephthalate resin, a polytetrafluoroethylene resin, or a polypropylene resin.

7. The powder coating composition of claim 5 further comprising an effective amount of a curing agent.

8. The powder coating composition of claim 1 wherein the POSS compound is present in an amount from about 0.1 to about 10 wt. %, based on the weight of the coating composition.

9. The powder coating composition of claim 8 wherein the POSS compound is present in an amount from about 1 to about 5 wt. %, based on the weight of the coating composition.

10. A powder coating composition formed by melt blending a mixture of a powder coating composition containing:
    an epoxy powder coating resin, a polyester powder coating resin, an acrylic powder coating resin an urethane powder coating resin or mixtures thereof; with
    a POSS compound represented by the formula:

$$[RSiO_3]_8$$

where each R is independently a hydrogen radical, a siloxy radical, or a cyclic or linear aliphatic, aromatic, olefinic, an alkoxy hydrocarbon radical containing from 1 to 20 carbon atoms or a hydrogen radical, a siloxy radical, or a cyclic or linear aliphatic, aromatic, olefinic, an alkoxy hydrocarbon radical containing from 1 to 20 carbon atoms substituted with one or more alcohol, phenol, epoxide, ester, amine, ketone, olefin, ether, halide, alkoxysilane, chlorosilane, isocyanate, nitrile, or thiol functionality; to form a blended product and then grinding the blended product to form a powder.

11. The powder coating composition of claim 10 wherein R is a methyl, an ethyl, a propyl, a butyl, a hexyl, a heptyl, an octyl, a cyclohexyl, a phenyl a vinyl, an allyl, a hexenyl, a heptenyl, an octenyl radicals or a methyl, an ethyl, a propyl, a butyl, a hexyl, a heptyl, an octyl, a cyclohexyl radical linked to an Si by oxygen.

12. The powder coating composition of claim 10 wherein the POSS compound is present in an amount from about 0.1 to about 10 wt. %, based on the weight of the coating composition.

13. The powder coating composition of claim 12 wherein the POSS compound is present in an amount from about 1 to about 5 wt. %, based on the weight of the coating composition.

* * * * *